US012067532B2

United States Patent
Ramaswamy et al.

(10) Patent No.: US 12,067,532 B2
(45) Date of Patent: Aug. 20, 2024

(54) ADOPTION CONTENT PROPAGATION BASED ON USER COLLABORATION DATA

(71) Applicant: Microsoft Technology Licensing, LLC, Redmond, WA (US)

(72) Inventors: Sanjay Hemmige Ramaswamy, Redmond, WA (US); Jagadeesh Virupaksha Huliyar, Redmond, WA (US); Sreeram Nivarthi, Redmond, WA (US); Ritu Lakhotia, Kolkata (IN); Vindana Madhuwantha, Bothell, WA (US); Apurva Bharatkumar Shah, Bengaluru (IN); Ganesh Jaiswal, Bhanpura (IN); Siddarth Rajendra Kumar, Bengaluru (IN); V. S. Srujana Oruganti, Bangalore (IN); Vishnu Gajendran, Tiruchirappalli (IN); Sai Sumana Pagidipalli, Bengaluru (IN); Sunil Kumar, Bangalore (IN); Nimesh Ravindra Desai, Bangalore (IN); Nishtha Mehrotra, Uttar Pradesh (IN); Diego Fernando Suarez Castillo, Seattle, WA (US); Neha Parikh Shah, New York, NY (US); Aaron James Harrison, Bellevue, WA (US); Tannaz Sattari Tabrizi, Bellevue, WA (US); Aleksey Y. Ashikhmin, Redmond, WA (US); Carlos Andres Morales Torrado, London (GB); Amit Prem Manghani, Alameda, CA (US); Sida Peng, Chestnut Hill, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 16/880,441

(22) Filed: May 21, 2020

(65) Prior Publication Data
US 2021/0319402 A1 Oct. 14, 2021

(30) Foreign Application Priority Data

Apr. 10, 2020 (IN) .............................. 202041015737

(51) Int. Cl.
*G06Q 10/10* (2023.01)
*G06F 16/176* (2019.01)
*H04L 12/18* (2006.01)

(52) U.S. Cl.
CPC ......... *G06Q 10/103* (2013.01); *G06F 16/176* (2019.01); *H04L 12/1831* (2013.01)

(58) Field of Classification Search
CPC .. G06Q 10/103; G06F 16/176; H04L 12/1831
See application file for complete search history.

(56) References Cited

U.S. PATENT DOCUMENTS 8,359,276 B2  1/2013  Zhuang et al.
9,449,096 B2  9/2016  Balmin et al.
(Continued)

OTHER PUBLICATIONS

"International Search Report and Written Opinion Issued in PCT Application No. PCT/US2021/018432", Mailed Date: May 31, 2021, 10 Pages.

(Continued)

*Primary Examiner* — Nam T Tran
(74) *Attorney, Agent, or Firm* — Schwegman Lundberg & Woessner, P.A.

(57) ABSTRACT

A system and method for configuring an application is described. The system identifies user collaboration data of users of an application. The user collaboration data indicates durations of collaborations between one or more users using the application. The system computes an influencer score of a first user based on the duration of collaborations between the first user and the other users. The system determines that the influencer score of the first user exceeds an influencer score threshold and generates a configuration setting of the (Continued)

application for the first user. The system applies the configuration setting to the application for the first user.

20 Claims, 13 Drawing Sheets

(56) References Cited

U.S. PATENT DOCUMENTS

| | | | |
|---|---|---|---|
| 9,485,318 | B1 | 11/2016 | Harris et al. |
| 9,594,825 | B2 | 3/2017 | Skarin et al. |
| 9,632,972 | B1 | 4/2017 | Moxley et al. |
| 9,691,051 | B2* | 6/2017 | Rexer ..................... G06F 3/048 |
| 9,946,975 | B2 | 4/2018 | Paul et al. |
| 10,382,722 | B1* | 8/2019 | Peters .................... H04N 7/152 |
| 10,706,716 | B2* | 7/2020 | Drake ..................... E05F 15/77 |
| 2006/0053196 | A1 | 3/2006 | Spataro et al. |
| 2015/0004587 | A1* | 1/2015 | Rozycki .................. G09B 7/02 434/322 |
| 2015/0067048 | A1* | 3/2015 | Kannan .................. G06Q 50/01 709/204 |
| 2016/0035046 | A1* | 2/2016 | Gupta ................ G06Q 30/0201 705/7.29 |
| 2017/0212664 | A1* | 7/2017 | Ghadiyali .......... G06Q 30/0271 |
| 2017/0212898 | A1* | 7/2017 | Desmond ................ H04W 4/80 |
| 2017/0279905 | A1* | 9/2017 | Shah ................... H04L 12/1822 |
| 2018/0060818 | A1* | 3/2018 | Ishiyama ........... G06Q 10/0635 |
| 2018/0260718 | A1* | 9/2018 | Biswas ............... G06F 16/3322 |
| 2020/0372538 | A1* | 11/2020 | Fox .................... G06Q 30/0254 |
| 2020/0401977 | A1* | 12/2020 | Ren .................. G06Q 10/06398 |
| 2021/0231994 | A1* | 7/2021 | Lu ......................... H01L 23/544 |
| 2022/0086393 | A1* | 3/2022 | Peters .................... G06V 20/41 |

OTHER PUBLICATIONS

"Degree of Centralization", Retrieved from: https://opentextbc.ca/businessopenstax/chapter/degree-of-centralization/, Retrieved Date: Feb. 12, 2020, 4 Pages.

"How to Identify the Right Influencers by Using Accurate Data Insights", Retrieved from: https://support.socialbakers.com/hc/en-us/articles/360022823192-How-to-Identify-the-Right-Influencers-By-Using-Accurate-Data-Insights, Retrieved Date: Feb. 7, 2020, 14 Pages.

Barysevich, Aleh, "Seven best tools to find influencers on social media", Retrieved from: https://www.searchenginewatch.com/2019/03/04/best-tools-to-find-social-media-influencers/, Mar. 4, 2019, 9 Pages.

Battilana, et al., "The Network Secrets of Great Change Agents", Retrieved from: https://hbr.org/2013/07/the-network-secrets-of-great-change-agents, Jul. 2013, 12 Pages.

Brown, Eileen, "Strong and Weak Ties: Why Your Weak Ties Matter", Retrieved from: https://www.socialmediatoday.com/content/strong-and-weak-ties-why-your-weak-ties-matter, Jun. 30, 2011, 5 Pages.

Cross, Rob, "Don't Let Your Best-Connected People Become Bottlenecks", Retrieved from: https://microsoft.myhbp.org/leadingedge/asset/view/H00AVW-PDF-ENG, Jul. 9, 2013, 3 Pages.

Dhaygude, et al., "User Connector Based on Organization Graph", Application as Filed in U.S. Appl. No. 16/739,393, Filed Date: Jan. 10, 2020, 41 Pages.

Farren, Caela, "Help New Hires Succeed: Beat the Statistics", Retrieved from: http://thewynhurstgroup.com/wp-content/uploads/2014/07/Help-New-Hires-Succeed.pdf, May 28, 2007, 8 Pages.

Fuller, Ryan, "A Primer on Measuring Employee Engagement", Retrieved from: https://hbr.org/2014/11/a-primer-on-measuring-employee-engagement, Nov. 17, 2014, 8 Pages.

Makovsky, Ken, "Identifying Company Influencers", Retrieved from: https://web.archive.org/web/20120524071021/ https:/www.forbes.com/sites/kenmakovsky/2012/05/22/identifying-company-influencers/, May 22, 2012, 3 Pages.

Merrill, et al., "Findings from an Organizational Network Analysis to Support Local Public Health Management", In Journal of Urban Health, vol. 85, Issue 4, Jul. 1, 2008, pp. 572-584.

Morgan, Jacob, "The Strength of Weak Ties (And Why They Matter to Collaboration)", Retrieved from: https://thefutureorganization.com/strength-weak-ties-collaboration/, Aug. 24, 2012, 5 Pages.

Rabinowitz, Howard, "How to identify your company's secret influencers", Retrieved from: https://workflow.servicenow.com/employee-engagement/internal-influencers-in-organization/, Sep. 16, 2019, 6 Pages.

Teten, David, "What distinguishes a strong tie from a weak tie?", Retrieved from: https://www.thevirtualhandshake.com/2004/05/25/what-distinguishes-a-strong-tie-from-a-weak-tie/, May 25, 2004, 5 Pages.

Zbieg, et al., "How to Select Change Agents in Organizations? A Comparison of the Classical and Network Approaches", In Journal of Problemy Zarz?dzania, vol. 14, No. 08, Dec. 2016, pp. 120-143.

* cited by examiner

ADOPTION CONTENT PROPAGATION BASED ON USER COLLABORATION DATA

CLAIM OF PRIORITY

This patent application claims the benefit of priority to IN Application Serial No. 202041015737, filed Apr. 10, 2020, which is incorporated by reference herein in its entirety.

TECHNICAL FIELD

The subject matter disclosed herein generally relates to a special-purpose machine that analyzes communications between client devices, including computerized variants of such special-purpose machines and improvements to such variants. Specifically, the present disclosure addresses systems and methods for configuring an enterprise application based on enterprise organizational data and collaboration data of users of the enterprise application.

BACKGROUND

Accessing metrics related to operations or usage of an application by users of an organization can be difficult to determine given the millions of data point entries and the lack of context of computed metrics. Furthermore, the effectiveness and accuracy of human-driven analysis of large sets of data is increasingly low compared to machine-driven analysis. For example, if an organization needs a time sensitive analysis of a data set that has millions of entries across hundreds of variables, no human could perform such an analysis by hand or mentally. Furthermore, any such analysis may be out-of-date almost immediately, should an update be required.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
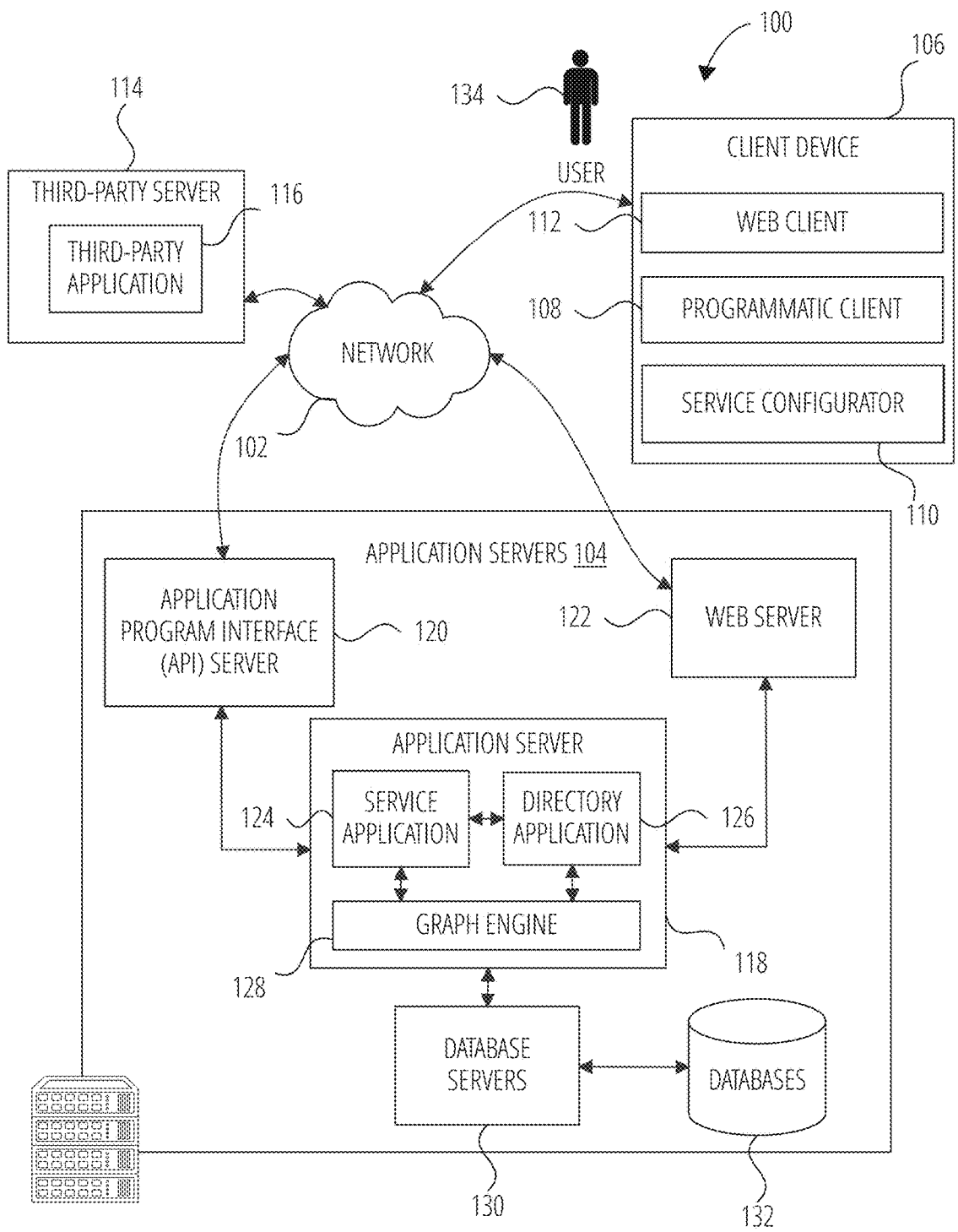
FIG. 1 is a diagrammatic representation of a networked environment in which the present disclosure may be deployed, in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a system that identifies users of an application in an enterprise network. An enterprise represents organizations or groups of users associated with an organization. The system identifies users based on real-time collaboration data between the users of the application. The collaboration data include collaboration or interaction signals such as emails, meetings, individual chats, group chats. The present application describes an algorithm that compute scores based on collaboration data. In one example, the algorithm computes an influencer score of a user based on a relative duration of collaboration or interactions between the user and other users. The influencer score may also depend on a type of interactions (e.g., email vs 1:1 meeting), and a type of user profile (e.g., a manager interacting with a project engineer). The system identifies users with an influencer score that exceeds an influencer threshold score. In another example, the system ranks the users according to their influencer score and identifies the top users as "influencers" or "top influencers" (also referred to as "change agent") within the enterprise.

Once the system identifies the influencers, the system measures a centrality of the enterprise to determine how many users from the enterprise leadership ranks are also influencers. In another example, the system can be used to promote adoption content (e.g., using a new feature of the application, attending a particular meeting) to the influencers who then propagate the adoption content to other users. The system measures an adoption rate for each user based on updated real-time collaboration data and usage operations of the application by the users of the enterprise. Based on the adoption rate, the system can identify users with a higher adoption rate and users with a lower adoption rate. The system can customize a configuration setting for a user in a lower adoption rate.

In one example embodiment, a system and method for configuring an application is described. The system identifies user collaboration data of users of the application. The user collaboration data indicates durations of collaborations between one or more users using the application. The system computes an influencer score of a first user based on the duration of collaborations between the first user and the other users. The system determines that the influencer score of the first user exceeds an influencer score threshold and generates a configuration setting of the application for the first user. The system applies the configuration setting to the application for the first user.

In another example embodiment, the system determines that the first user interacted, via the application, with a second user based on the user collaboration data. The system identifies an individual duration of collaboration of the first user with the second user based on the interaction. The system also identifies a total duration of collaboration of the first user with the other users in the enterprise. The system computes a relative duration of collaboration of the first user with the second user based on a ratio of the individual duration of collaboration of the first user with the second user and the total duration of collaboration of the first user with the other users. The system renders a graphical user interface that indicates the relative duration of collaboration of the first user. The influence score of the second user is based on the relative duration of collaboration of the first user with the second user.

As a result, one or more of the methodologies described herein facilitate solving the technical problem of optimizing individual user operations of an application. For example, instead of manually configuring the application of each user who is identified as an "influencer," the system identifies "influencers" in an organization based on real-time collaboration data and automatically applies custom configuration settings to the application associated with the "influencer."

Other advantages of the present system include a system that can react to changes in the enterprise, across multiple dimensions, a system that is capable of handling very-large scale populations (e.g., over a million nodes and interactions), a system that is capable of handling a multitude of interactions by according different semantics depending on the type of collaborative interaction, attributes of the collaborators, intent of collaboration, a system that is capable of running across entire history of collaboration or a specific time range, a system that preserves privacy rules as laid out by the enterprise, and a system that is extensible to accommodate additional types of collaboration, attributes of collaborators.

As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 134 operates the client device 106. The client device 106 includes a web client 112 (e.g., a browser), a programmatic client 108 (e.g., an email/calendar application such as Microsoft Outlook™, an instant message application, a document writing application, a shared document storage application) that is hosted and executed on the client device 106.

In one example embodiment, the programmatic client 108 includes a service configurator 110 that configures a setting of the programmatic client 108 (e.g., configure different types/interval of reminders, preset custom messages or notifications, other settings on how the programmatic client 108 operates with new features or custom features for user 134). In one embodiment, the service configurator 110 receives a configuration setting from the service application 124 or the graph engine 128 and implements the received configuration setting.

The service configurator 110 may operate with the web client 112 and/or the programmatic client 108. In another example embodiment, the service configurator 110 is part of the programmatic client 108 or web client 112. For example, the service configurator 110 may operate as an extension or add on to the web client 112. The service configurator 110 communicates with the application servers 104.

An Application Program Interface (API) server 120 and a web server 122 provide respective programmatic and web interfaces to application servers 104. A specific application server 118 hosts a service application 124, a directory application 126, and the graph engine 128. The service application 124, the directory application 126, and the graph engine 128 include components, modules and/or applications.

The service application 124 may include an application operated by the enterprise 324. Examples of service application 124 include collaborative applications (e.g., a server side email/calendar enterprise application, a server side instant message enterprise application, a document writing enterprise application, a shared document storage enterprise application) that enable users of an enterprise to communicate with each other, collaborate and share document, messages, and other data (e.g., meeting information, common projects). For example, the user 134 at the client device 106 may access the service application 124 to edit documents that are shared with other users of the same enterprise. In another example, the client device 106 accesses the service application 124 to retrieve or send messages or emails to and from other peer users of the enterprise. Other examples of service application 124 includes content management systems, and knowledge management systems.

The directory application 126 includes a directory application (also referred to as active directory) that maintains enterprise organizational data. One example of enterprise organizational data include user profile data of enterprise users of the enterprise. For example, an enterprise user profile of an enterprise user includes a user hierarchy level attribute (e.g., manager level 4, VP level 3, project engineer level 6), a user ID, a user email, a user department, a user manager, user group projects, user employment status, user skills, user expertise, user experience, user background, any information provided by other department (e.g., Human Resource), and so forth. In another example embodiment, the directory application 126 includes or has access to other enterprise systems such as Customer Relation Management (CRM) systems, social network profile system, or other survey systems.

In one example embodiment, the graph engine 128 communicates with the service application 124 to access interaction/collaboration data from users of the service application 124. The interaction/collaboration data identifies communication events items (e.g., who emailed what, who spent how long with who) between users (of the enterprise)

of the service application 124. Examples of interaction data include but are not limited to email communications, meeting communications, instant messages, shared document comments, and any communication with a recipient (e.g., a user from the enterprise). The graph engine 128 uses the collaboration data to help identify a top influencer (e.g., a user having a higher level of influence over other users as measured by relative time spent by other users with the influencer). It is noted that the identification of the top influencer represents one example of a user feature provided by the graph engine 128 that forms a graph based on interaction/collaboration data and user profile data. Other features of the graph engine 128 include computing an influencer score, ranking the influencers based on the influencer score, identifying a centrality of the influencers (e.g., how they fit within the leadership hierarchy), identifying a rate of propagation of adoption content, and identifying users with a higher rate of adoption and users with a lower rate of adoption. The graph engine 128 can customize the configuration settings for each user based on identification (e.g., influencer, enabler, resistor) from the graph engine 128.

The graph engine 128 also communicates with the directory application 126 to access enterprise organizational data (e.g., user profile, organization attributes, hierarchy attribute). In another example embodiment, the graph engine 128 communicates with the service configurator 110 to provide the custom configuration setting. The graph engine 128 communicates with the service configurator 110 supported by the web server 122. In one example, the web client 112 communicate with the graph engine 128 and service application 124 via the programmatic interface provided by the Application Program Interface (API) server 120.

In another example embodiment, the graph engine 128 forms a dataset comprising the interaction/collaboration data and the enterprise organizational data. The graph engine 128 uses the dataset to form a graph based on user interactions/collaborations. The graph includes edges that represents the users and vertices that represent an amount of interaction (e.g., frequency, duration, time reading an email, time composing an email) and a type of interaction (e.g., email vs chat)

The application server 118 is shown to be communicatively coupled to database servers 130 that facilitates access to an information storage repository or databases 132. In one example embodiment, the databases 132 includes storage devices that store information to be processed by the service application 124 and the graph engine 128.

Additionally, a third-party application 116 may, for example, store another part of the service application 124, or include a cloud storage system. The third-party application 116 executing on a third-party server 114, is shown as having programmatic access to the application server 118 via the programmatic interface provided by the Application Program Interface (API) server 120. For example, the third-party application 116, using information retrieved from the application server 118, supports one or more features or functions on a website hosted by the third party.

Figure 2:
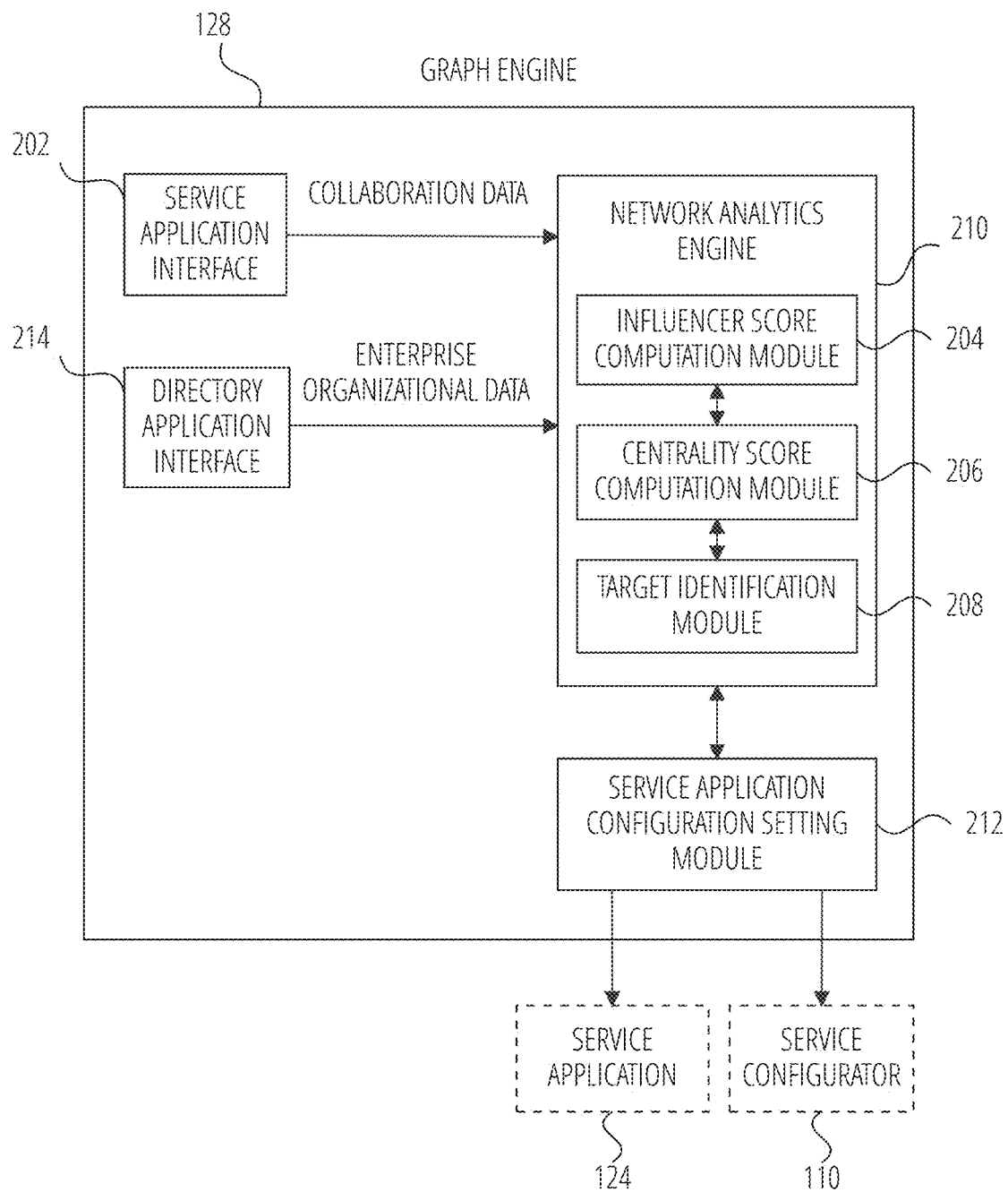
FIG. 2 is a block diagram illustrating a graph engine in accordance with one example embodiment.

FIG. 2 is a block diagram illustrating a graph engine 128 in accordance with one example embodiment. The graph engine 128 includes a service application interface 202, a directory application interface 214, a network analytics engine 210, and a service application configuration setting module 212.

The service application interface 202 accesses collaboration data from the service application 124. The collaboration data are based on user interaction data between users of the enterprise. For example, a first user emails a second user a message related to a project (e.g., using email subject header or identifying preset keywords in the body of the message). The collaboration data identifies the interactions between the first user and the second user (e.g., how long the first user spent writing the email, how long the second user spent reading the email, how often the first and second users communicate with each other, have meetings, collaborate on common projects, when the first and second users communicate, with whom the first and second users communicate). In another example embodiment, the service application interface 202 retrieves user interaction data from a combination of the service configurator 110, the web client 112, the programmatic client 108, and the service application 124.

The directory application interface 214 accesses enterprise organizational data (e.g., user hierarchy data) from the directory application 126. The enterprise organizational data include, for example, user profile data of enterprise users of the enterprise. For example, an enterprise user profile of an enterprise user includes a user leadership level, a user ID, a user email, a user department, a user manager, user group projects, user employment status, user skills, user expertise, user experience, user background, any information provided by other department (e.g., Human Resource), and so forth. In another example embodiment, the directory application interface 214 accesses enterprise organizational data to other enterprise systems such as Customer Relation Management (CRM) systems, social network profile system, or other survey systems. These systems can be internal or external to the directory application 126.

The network analytics engine 210 generates a graph based on the collaboration data and the enterprise organization data. In one example embodiment, the network analytics engine 210 comprises an influencer score computation module 204, a centrality score computation module 206, and a target identification module 208.

The influencer score computation module 204 generates a graph that depicts interactions between users relative. The graph may indicate (e.g., enterprise user HR attributes, collaboration map (e.g., who the enterprise users communicate with), time allocation (e.g., when, how long, and how often do the users communicate. The influencer score computation module 204 computes an influencer score of a user and ranks the users based on their corresponding influencer score.

In one example embodiment, the influencer score computation module 204 models a graph based on the collaboration data (e.g., collaboration/interaction network between users of the enterprise). For example, the influencer score computation module 204 models the users as vertices and collaboration data between them as edges. The influencer score computation module 204 applies the following transformations to the user and their corresponding collaboration/interaction.

Vertex: Each user from the enterprise is represented as a single vertex (also referred to as node).

Edges: There is only one edge between 2 user vertices in the graph if there has been any collaboration between them. The edge weight between vertices is a proxy for relative collaboration between two users representing the vertices. The influencer score computation module 204 computes edge weight based on time spent in collaboration between two users, time spent in collaboration by each user and the relative weight to each collaboration type (e.g., example email, meeting, chat, etc.).

In another example embodiment, the influencer score computation module 204 models the graph based on relative collaboration duration. An influencer influences a set of people. In order to measure the influence that one person has on another in the enterprise, one good proxy is time spent in collaboration with a person. If person "A" spends time collaborating with Person "B", then it can be said that person A gives some importance to person B. Hence, person A is spending his/her valuable time with person B. This can be a measure of influence of person B. However, it may be possible that someone's job is to collaborate or spend time collaborating. Hence, collaboration duration alone itself cannot be an indicator of importance given by a person to another. Because time is a fixed resource, time spent in collaboration by "A" with "B" versus overall time that "A" spends in collaboration is a good indicator of importance that "A" gives to "B".

In another example embodiment, the influencer score computation module 204 models the graph based on a leadership hierarchy of the user. For example, a relative collaboration of "x" with one's teammate is not the same as relative collaboration of "x" with another person who is more important than one's teammate (e.g., CEO of the enterprise). This information may be based on the user profile information from the directory application 126. In another example, in order to differentiate the importance received from collaborating with different persons, the score that the person already has (in iterations prior to the current iterations) is multiplied with the relative collaboration and then added to the score in the current iteration for the person being considered.

The influencer score computation module 204 uses different weights for different signals, collaboration/interaction (e.g. emails, meetings, chats, etc.). Each of these signals have additional dimensions based on person involved in the collaboration (e.g., for example, 1:1, 1:1 with Manager, Large group collaboration vs small group collaboration, Intra team collaboration vs Inter team collaboration, acceptance-status of the meeting, mail read or not). Every signal is not equal nor is every signal instance with different attribute values for the above. People collaborating via these different mediums (e.g., signals) impact the influence differently as some types of collaboration are more personal in nature versus the others (e.g., meetings vs mails). Attributes like 1:1 meeting versus a large group meeting also affect the connection that is created between users which later affects their ability to influence people. Hence, the algorithm from the influencer score computation module 204 assigns different weights for different signals and within each signal different weight for signal instances based on the attributes mentioned above.

The following illustrates an example algorithm implemented by the influencer score computation module 204. The following example explains edge weight computation for email and meeting signals. Every raw email edge or signal contributes towards weight of the email-collaboration-edge-weight. It will contribute towards two email-collaboration-weights.

For example, an email has been sent by "A" to "B", "C", "D" and "E". There would be outgoing edge from "A" to "B", "C", "D" and "E" because "A" has spent time writing an email to "B", "C", "D" and "E". Similarly, there would be an outgoing edge from "B", "C", "D" and "E" to "A" because "B", "C", "D" and "E" have spent time reading the email.

The algorithm computes the weights considering the time a person has spent sending or reading emails. The weights are computed for both reading and writing the emails:

email-collaboration-edge-weight $(A \rightarrow B)=$
$((\Sigma_{Mail(j) \text{ from } A\text{-}B}$ (time-spent-writing-mail($j$))/no-people-mail-sent-to($j$))/$\Sigma_{Mail (d) \text{ sent by } A}$ (time-spent-writing-mail($d$)))+$(\Sigma_{Mail(j) \text{ from } B\text{-}A}$ time-spent-reading-mail($j$))/$(\Sigma_{Mail (d) \text{ Received by } A}$ (time-spent-reading-mail($d$)))))

meeting-collaboration-edge-weight $(A \rightarrow B)=$
$(\Sigma_{Meeting (j) \text{ where both } a \text{ and } b \text{ are present}}$ (meeting-time($j$)/(number-of-participants($j$)−1)))/$(\Sigma_{Meeting (d) \text{ attended by } A}$ (meeting-time))

edge-weight $(A \rightarrow B)=w1$*email-collaboration-edge-weight+$w2$*meeting-collaboration edge weight.

The above algorithm explains computation with weights based on email and meetings. However, there are weights for not just signals but also based on characteristics/attributes of signal instances such as the ones mentioned above (e.g., 1:1, 1:1 with manager, large group collaboration vs small group collaboration, Intra team collaboration vs Inter team collaboration, acceptance-status of the meeting, mail read or not, etc.).

In one example embodiment, since the scale at which we are operating is large (the number of vertices could run in millions and number of connections/edges could run into hundreds of millions or billions) the algorithm may not run as a single machine implementation. It is run in a distributed fashion in multiple iterations. In every iteration the following happens: Vertex representing a person sends message to all its neighbors. Message is its current Influence Score, multiplied by edge weight computed as per above mentioned formula. The neighbors receive the messages, aggregates the score and that becomes the new score (Delta is added to old score instead of replacing the value) of that neighbor. This computation is repeated across multiple iterations. The vertex value converges when the delta between new score and old one is below a certain threshold or when a fixed number of iterations is reached. When all vertices converge the algorithm converges.

The centrality score computation module 206 computes a centrality score of an enterprise based on the number of top leaders in the enterprise and the number of influencers in the enterprise. The leaders include users of the enterprise where the users are managers that occupy a top percentage of the level in a leadership hierarchy. For example, a leader may be defined as a user with a manager attribute level of 7 and above (e.g., level 1 being the lower, level 9 being the highest). The top influencers include users of the enterprise where the users have a top percentage of influencer scores in the enterprise (regardless of manager attribute level). For example, a top influencer may be defined as a user with an influencer score in the top 30% of the users in the enterprise.

For example, the centrality score measures how centralized an enterprise is. It is a measure of influence held by leaders in an enterprise versus non-leaders. In other words, the centrality score computation module 206 indicates what portion of the top influencers are leaders versus non-leaders.

The centrality score computation module 206 computes the centrality score based on the following algorithm:

Organizational Centralization Index=(Number of Leaders among Top Influencers)/(Number of Top Influencers).

First, the centrality score computation module 206 determines a Top Influencer. Since this is related to Organizational Centralization and since in an enterprise the leaders can be expected to influence decision making, the centrality score computation module 206 creates a threshold for Top Influencers based on the total number of Leaders.

Let "N" be number of leaders in an enterprise. Then, people with "Top N" Influencer scores can be considered as influential which means that there are "N" slots on the table of Influencers.

Depending on how many of these slots are occupied by Leaders vs Non-Leaders the index can be computed. Hence Organizational Computational Index can be defined as (Number of Leaders among Top "N" Influencers)/(N), where N is Number of Slots available at the Influencers Table (mapped to Total Number of Leaders).

Second, the centrality score computation module 206 defines who is a leader. A leader can be defined as managers who occupy, for example, the top "35%" of the positions/levels in the leadership hierarchy. For example, if there are 9 hierarchy levels in an Organization then managers in Levels 7, 8 and 9 can be considered as Leaders (Assuming Level 9 is higher than Level 1). The hierarchy levels can be computed from a Manager Hierarchy attribute from the user profile).

The target identification module 208 computes an adoption rate of users for adoption content provided to the influencers. The influencer score computation module 204 identifies the top influencers and groups in an organization. The target identification module 208 next optimizes for the minimum number of influencers needed to reach 100% of the network within one or two hops (or degrees of collaboration).

The target identification module 208, based on the type of change intervention desired, takes influencers are grouped into personas/cohorts using similar organizational attributes and behavioral characteristics observed using service application 124 metadata (sending 1:1 emails, sending large group emails, sending attachments).

The target identification module 208 sends adoption content directly to influencers via email, chat, or other communication methods. Adoption content can include targeted emails, chat nudges, email nudges, custom learning content.

The target identification module 208 continues by measuring the rate of adoption, the type of engagement (features used) and the efficacy of each influencer in spreading the use of new features. Influencers can be grouped into "enablers" and "resisters." The workflow repeats itself by customizing different content to "enablers", to help them spread further, and "resisters" to bring them on board as adopters.

The service application configuration setting module 212 generates a configuration setting and applies the configuration setting to the service application 124 or the service configurator 110. For example, the service application configuration setting module 212 generates a configuration setting that provides different types of functionalities or features of the service application 124 (e.g., new user experiences) for a particular user. For example, the user experience include identifying other influencers, custom notification related to new features for adoption, custom reminder messages related to adoption content, and custom scheduling of the reminder or messages. In other examples, the configuration setting enables a new features in the service application 124 that automatically receives adoption content and suggests the adoption content to a group of users. In another example, the configuration setting enables a one-click feature that enables the user of the service application 124 to generate an email populated with preset adoption content (e.g., email suggesting use of a new or updated feature of the service application 124) and pre-addressed to select users. As such, with one-click, the user of the service application 124 can send a dynamically updated pre-written message to pre-defined users.

Figure 3:
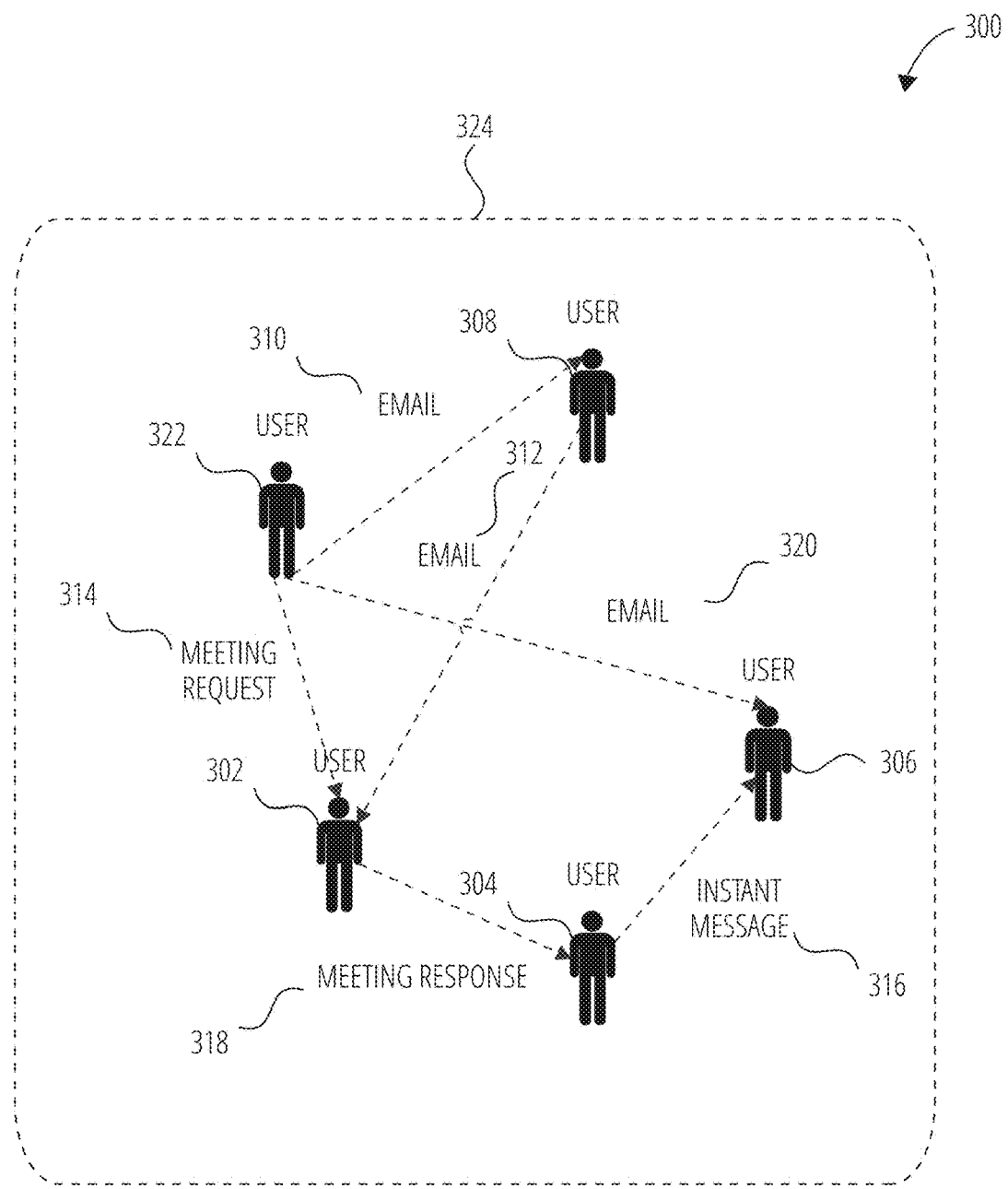
FIG. 3 is a graph representing interactions between users of a service application in an enterprise, in accordance with one example embodiment.

FIG. 3 is a graph 300 illustrating interactions between users in an enterprise, in accordance with some example embodiments. The diagram illustrates users (e.g., user 302, user 306, user 308, user 322) that are part of an enterprise 324. Each user operates a corresponding device (not shown) using one or more client applications (not shown) to communicate and collaborate with other users. In one example embodiment, each peer user client applications communicate with the application server 118.

For example, user 322 sends an email 310 to user 308, sends an email 320 to user 306, and sends a meeting request 314 to user 302. The user 308 receives the email 310 from user 322, sends an email 312 to user 302. The user 302 receives the meeting request 314 from user 322, receives the email 312 from user 308, and sends a meeting response 318 to user 304. The user 304 receives the meeting response 318 from user 302 and sends an instant message 316 to user 306.

In one example embodiment, the graph engine 128 collects user interaction data representing the interactions between peer users described above. In another example embodiment, the service application interface 202 accesses interaction data (e.g., how long a user read/wrote an email, how long a user spent time in a meeting with another user) from a corresponding user of a client device. The graph engine 128 collects the interaction data for a preset period of time (e.g., a one-week interval, year to date, or other time frame).

In another example embodiment, the graph engine 128 collects user interaction data for a user up to a preset degree of contacts. For example, if the preset degree is one, the interaction data for the user 322 includes interaction data for user 308, user 302, and user 306. A core working group of the user 322 would thus include user 308, user 302, and user 306.

Figure 4:
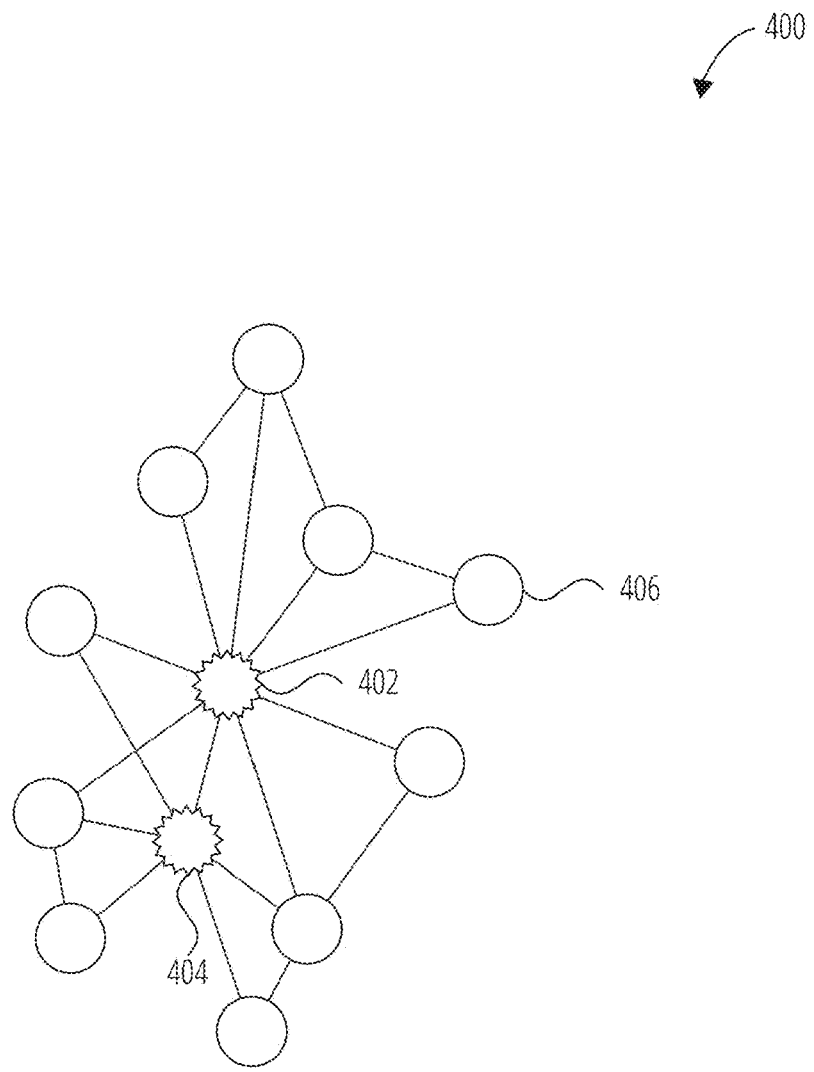
FIG. 4 is a graph representing influencers among users of a service application, in accordance with one example embodiment.

FIG. 4 is a graph representing influencers among users of a service application, in accordance with one example embodiment. The graph illustrates nodes (e.g., node 406) representing users of the service application 124. Among the nodes, the graph identifies top influencers (e.g., top influencer 402, top influencer 404).

Figure 5:
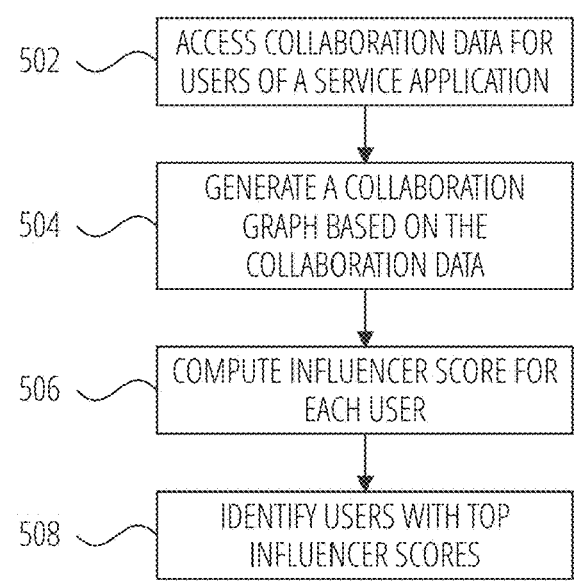
FIG. 5 is a flow diagram illustrating a method for computing an influencer score of a user in accordance with one example embodiment.

FIG. 5 is a flow diagram illustrating a method for computing an influencer score of a user in accordance with one example embodiment. Operations in the method 500 may be performed by the graph engine 128, using components (e.g., modules, engines) described above with respect to FIG. 2. Accordingly, the method 500 is described by way of example with reference to the graph engine 128. However, it shall be appreciated that at least some of the operations of the method 500 may be deployed on various other hardware configurations or be performed by similar components residing elsewhere. For example, some of the operations may be performed at the service configurator 110.

At block 502, the service application interface 202 accesses collaboration data for users of the service application 124. At block 504, the influencer score computation module 204 generates a graph based on the collaboration data. At block 506, the influencer score computation module 204 computes an influencer score for each user of the enterprise. An example of the algorithm for generating the graph 300 and computing the influencer score for each user is previously described with respect to influencer score computation module 204 in FIG. 2.

At block 508, the influencer score computation module 204 identifies users with top influencer scores (e.g., scores exceeding an influencer threshold). In one example embodiment, the influencer score computation module 204 identifies top influencers based on the following thresholds:

TOP 15% of influencer score, if the measured user count for the entire enterprise is >200 and <=1000

TOP 10% of influencer score, if the measured user count for the entire enterprise is >1000 and <=5000

TOP 5% of influencer score, if the measured user count for the entire enterprise is >5000

Figure 6:
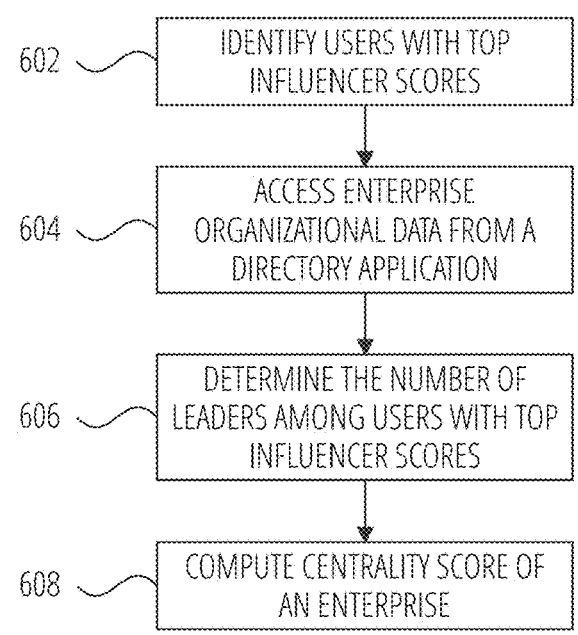
FIG. 6 is a flow diagram illustrating a method for computing a centrality score of an enterprise in accordance with one example embodiment.

FIG. 6 is a flow diagram illustrating a method 600 for generating a graph in accordance with one example embodiment. Operations in the method 600 may be performed by the graph engine 128, using components (e.g., modules, engines) described above with respect to FIG. 2. Accordingly, the method 600 is described by way of example with reference to the graph engine 128. However, it shall be appreciated that at least some of the operations of the method 600 may be deployed on various other hardware configurations or be performed by similar components residing elsewhere. For example, some of the operations may be performed at the service configurator 110.

At block 602, the influencer score computation module 204 identifies users with top influencer scores. At block 604, the directory application interface 214 accesses enterprise organization data (e.g., user profile indicating an enterprise position attribute) from a directory application. At block 606, the centrality score computation module 206 determines the number of leaders among users with top influencer scores.

For example, the influencer score computation module 204 defines a high influencer is a user who falls in the:

TOP 30% of influencer score for a manager's level group, if the measured user count for the manager's level group is >=10 and <=20

TOP 15% of influencer score for a manager's level group, if the measured user count for the manager's level group is >20 and <=1000

TOP 10% of influencer score for a manager's level group, if the measured user count for the manager's level group is >1000 and <=5000

TOP 5% of influencer score for a manager's level group, if the measured user count for the manager's level group is >5000

At block 608, the centrality score computation module 206 computes a centrality score of an enterprise based on the centrality score. For example, the centrality score computation module 206 calculates the following:

the measured population (e.g., TotalUsersInTeam)

the actual number of high influencers in the team (e.g., HighInfluencersinTeam)

the expected number of high influencers in the team (e.g., HighinfluencersInTeamExpected), as 30% (if the team size is >=10 and <=20), 15% (if the team size is >20 and <=1000), 10% (if the team size is >1000 and <=5000), or 5% (if the team size is >5000) of TotalUsersInTeam, depending on team size.

Figure 11:
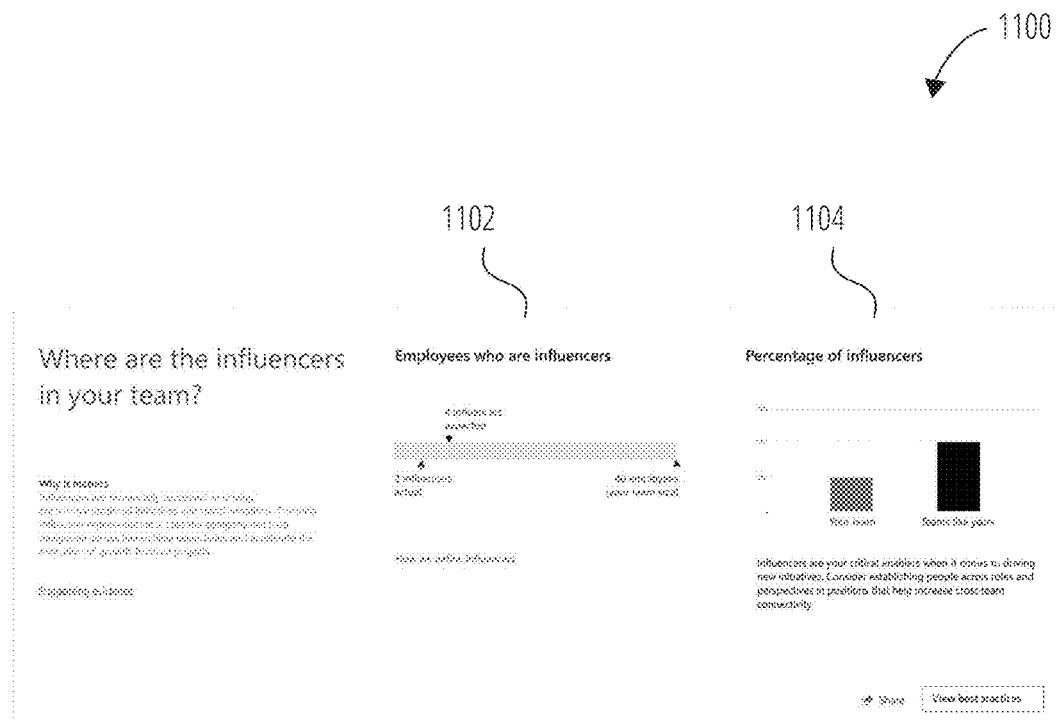
FIG. 11 illustrates an example screenshot of identifying influencers in a team in accordance with one example embodiment.

The centrality score computation module 206 uses these three data points (e.g., HighinfluencersinTeam, HighInfluencersInTeamExpected and TotalUsersInTeam) to generate a graphical user interface that illustrates the key metrics as illustrated in FIG. 11.

For example, for "Your team" in FIG. 11, the calculation is:

HighinfluencersInTeam/TotalUsersInTeam*100.

Figure 7:
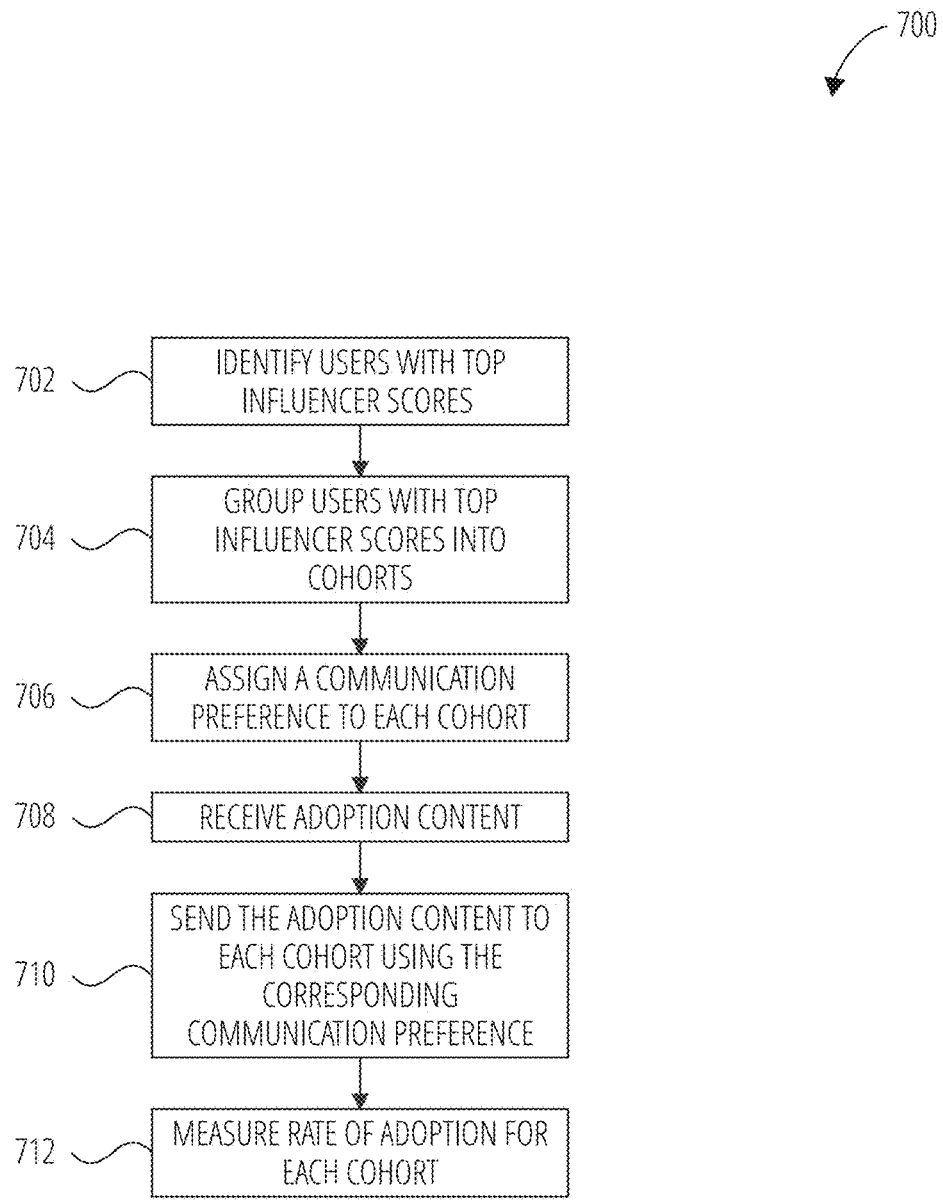
FIG. 7 is a flow diagram illustrating a method for measuring an adoption rate in accordance with one example embodiment.

FIG. 7 is a flow diagram illustrating a method 700 for generating a graph in accordance with one example embodiment. Operations in the method 700 may be performed by the graph engine 128, using components (e.g., modules, engines) described above with respect to FIG. 2. Accordingly, the method 700 is described by way of example with reference to the graph engine 128. However, it shall be appreciated that at least some of the operations of the method 700 may be deployed on various other hardware configurations or be performed by similar components residing elsewhere. For example, some of the operations may be performed at the service configurator 110.

At block 702, the influencer score computation module 204 identifies users with top influencer scores (e.g., influencer scores that exceeds an influencer threshold). At block 704, the target identification module 208 groups users with top influencer scores into cohorts (e.g., groups). At block 706, the target identification module 208 assigns a communication preference to each cohort.

following table illustrates an example of cohorts from different groups in an enterprise:

| Department | % Concentration of top influencers | Cohort Size | Communication Preference |
|---|---|---|---|
| Finance | 20% | 30 | emails, meeting requests |
| Sale | 30% | 25 | chats, texts |

At block 708, the target identification module 208 received adoption content (e.g., promoting a use or operation of a new feature of the service application 124). At block 710, the target identification module 208 sends the adoption content to each cohort using the corresponding communication preference. At block 712, the target identification module 208 measures a rate of adoption for each cohort.

Figure 8:
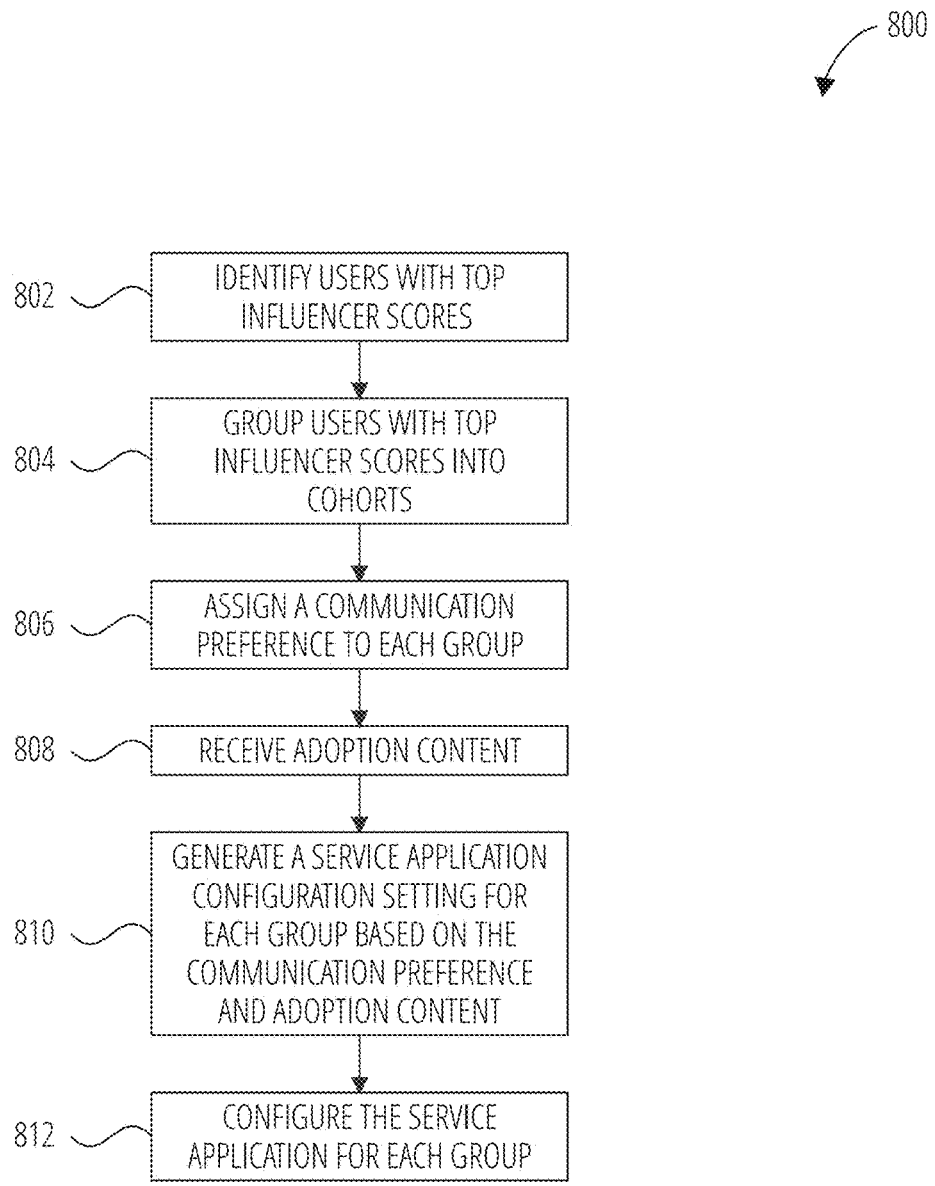
FIG. 8 is a flow diagram illustrating a method for configuring a service application in accordance with one example embodiment.

FIG. 8 is a flow diagram illustrating a method 800 for generating a graph in accordance with one example embodiment. Operations in the method 800 may be performed by the graph engine 128, using components (e.g., modules, engines) described above with respect to FIG. 2. Accordingly, the method 800 is described by way of example with reference to the graph engine 128. However, it shall be appreciated that at least some of the operations of the method 800 may be deployed on various other hardware configurations or be performed by similar components residing elsewhere. For example, some of the operations may be performed at the service configurator 110.

At block 802, the influencer score computation module 204 identifies users with top influencer scores. At block 804, the target identification module 208 groups users with top influencer scores into cohorts. The following table illustrates an example of cohorts from different groups in an enterprise:

| Department | Seniority | Tenure | % Concentration of top influencers | Cohort Size | Communication Preference |
|---|---|---|---|---|---|
| Finance | Manager | Mid | 20% | 30 | emails, meeting requests |
| Sale | Manager | Long | 30% | 25 | chats, texts |

At block 806, the target identification module 208 assigns a communication preference to each group. At block 808, the target identification module 208 receives adoption content (e.g., use of a new feature in the service application 124, attending an event, reading a document). At block 810, the service application configuration setting module 212 generates a service application configuration setting for each group based on the communication preference and adoption content. At block 812, the service application configuration setting module 212 configures the service application 124 for each group.

Figure 9:
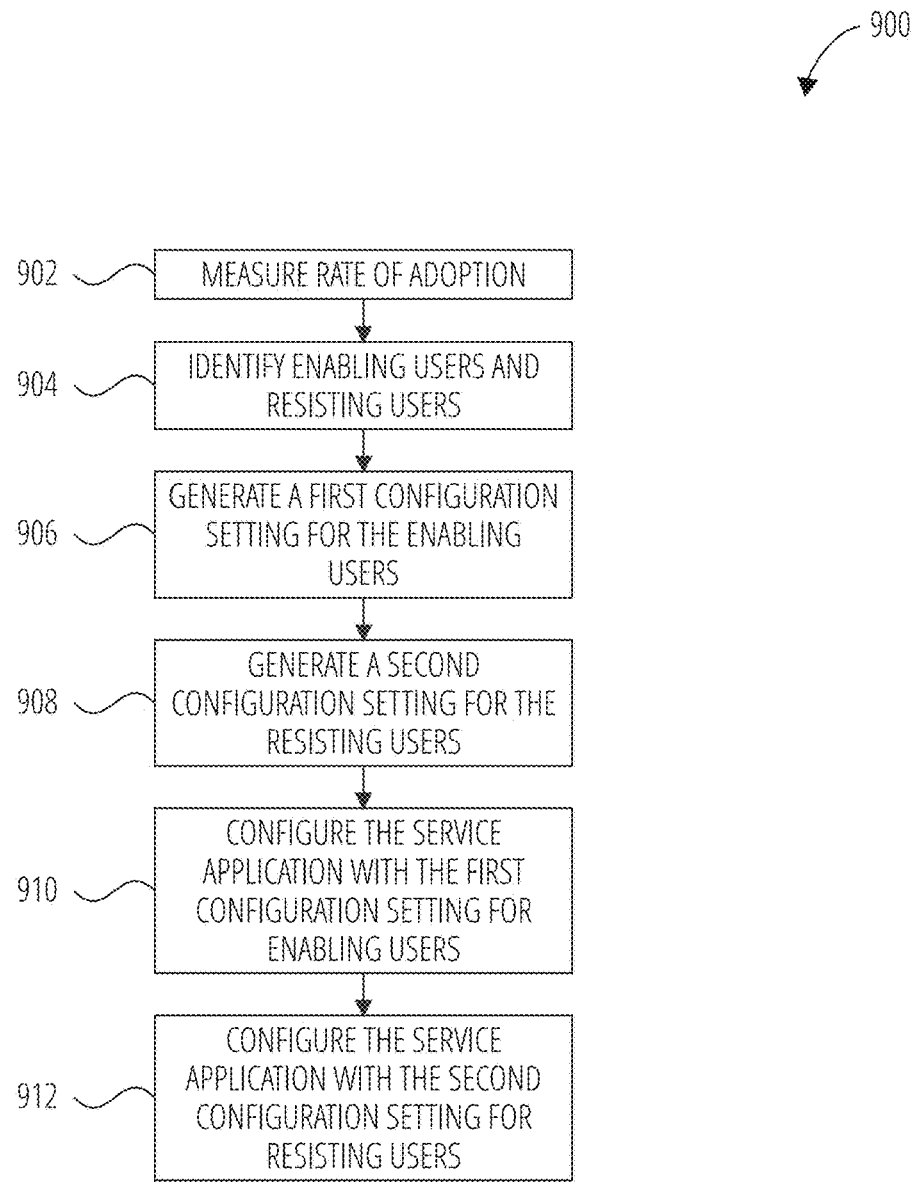
FIG. 9 is a flow diagram illustrating a method for configuring a service application in accordance with another example embodiment.

FIG. 9 is a flow diagram illustrating a method 900 for generating a graph in accordance with one example embodiment. Operations in the method 900 may be performed by the graph engine 128, using components (e.g., modules, engines) described above with respect to FIG. 2. Accordingly, the method 900 is described by way of example with reference to the graph engine 128. However, it shall be appreciated that at least some of the operations of the method 900 may be deployed on various other hardware configurations or be performed by similar components residing elsewhere. For example, some of the operations may be performed at the service configurator 110.

At block 902, the target identification module 208 measures a rate of adoption. In one example, the graph engine 128 measures adoption of the adoption event based on interaction/activities of operations of the service application 124 by each user. For example, the graph engine 128 determines how many users have read a document (adoption content) that was shared or promoted by a top influencer. The graph engine 128 identifies a rate of adoption for each user based on activities/operations (e.g., used a new promoted features, attended a promoted meeting) of the service application 124 after receiving the adoption content. The rate of adoption may be the number of activities (of a user on the service application 124) that comply with the adoption content divided by the total number of activities (of the user on the service application 124).

At block 904, the target identification module 208 identifies enabling users and resisting users based on the corresponding rate of adoptions. For example, users with an adoption rate lower than an adoption threshold are considered "resistors." Users with an adoption rate higher than the adoption threshold are considered "enablers." In another example, the target identification module 208 ranks the users based on their corresponding adoption rate and identifies the top percentage (e.g., 10%) of the ranked users as "enablers" and the remaining users as "resistors."

At block 906, the service application configuration setting module 212 generates a first configuration setting for the enabling users (e.g., disabling reminders or pop-up features from the service application 124). At block 908, the service application configuration setting module 212 generates a second configuration setting (e.g., more frequent reminders, added features to their calendars/emails/chat) for the resisting users. At block 910, the service application configuration setting module 212 configures the service application 124 with the first configuration setting for enabling users. At block 912, the service application configuration setting module 212 configures the service application 124 with the second configuration setting for the resisting users.

Figure 10:
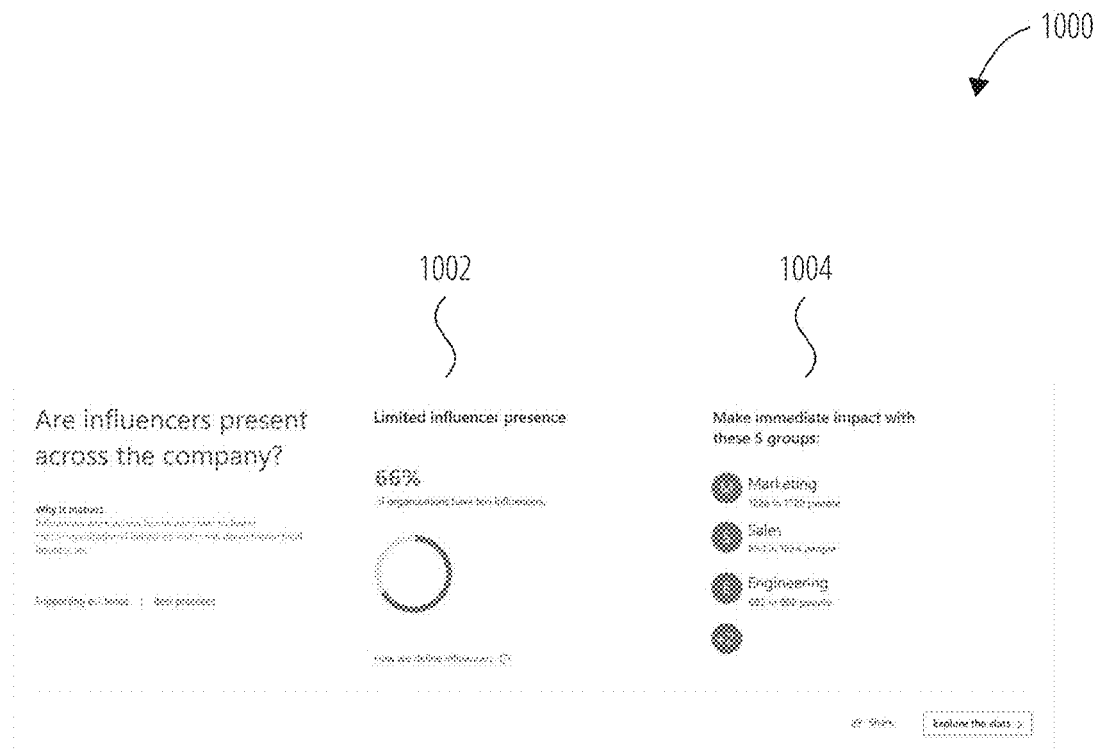
FIG. 10 illustrates an example screenshot of identifying groups of influencers in an enterprise in accordance with one example embodiment.

FIG. 10 illustrates an example screenshot 1000 that identifies groups of influencers in an enterprise in accordance with one example embodiment. The screenshot 1000 illustrates an influencer indicator 1002 (e.g., percentage of influencers in an enterprise) and an influencer group indicator 1004 (e.g., how many influencers are in a particular group).

FIG. 11 illustrates an example screenshot 1100 that identifies influencers in a team in accordance with one example embodiment. The screenshot 1100 illustrates a team influencer indicator 1102 (e.g., actual number of influencers per team size and expected number of influencers per team size) and a percentage of influencers indicator 1104 (e.g., percentage of influencers in a team vs percentage of influencers in a team of similar size (e.g., +/−10%).

Figure 12:
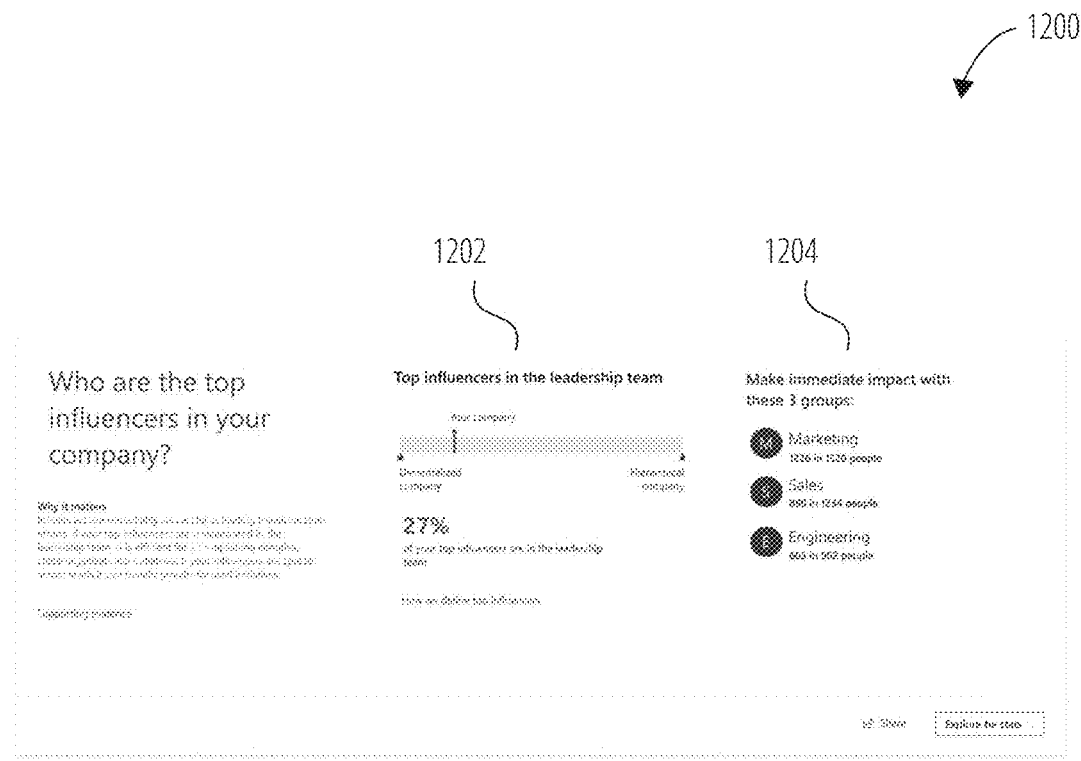
FIG. 12 illustrates an example screenshot of identifying influencers in a team in accordance with one example embodiment.

FIG. 12 illustrates an example screenshot 1200 that identifies influencers in a team in accordance with one example embodiment. The screenshot 1200 illustrates a top influencers in a leadership team indicator 1202 (e.g., percentage of top influencers from a leadership team, centrality index) and a group indicator 1204 (e.g., groups with a larger number of influencers).

Figure 13:
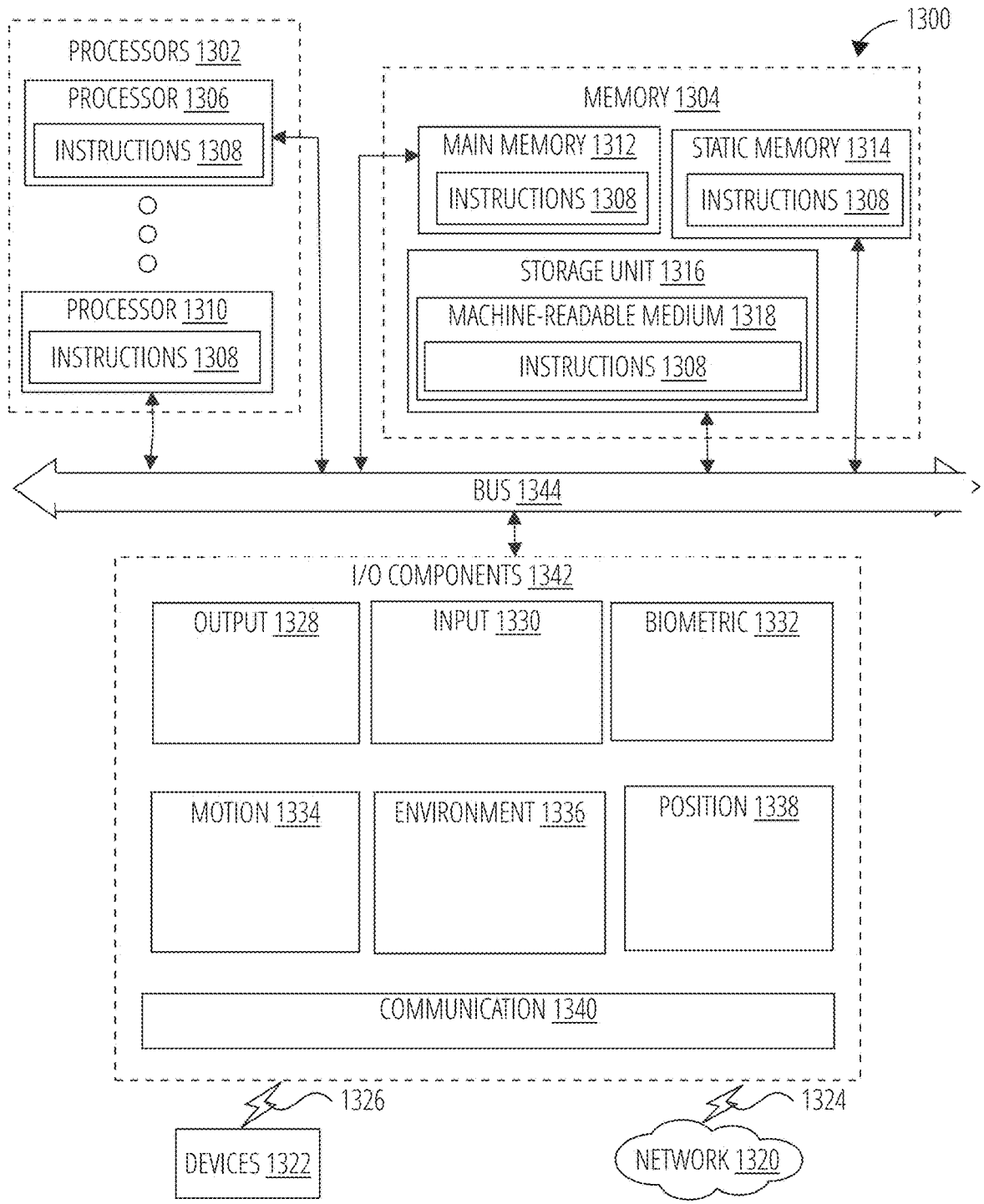
FIG. 13 is a diagrammatic representation of a machine in the form of a computer system within which a set of instructions may be executed for causing the machine to perform any one or more of the methodologies discussed herein, according to an example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various example embodiments, the I/O components 1342 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed embodiments.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: identifying user collaboration data of a plurality of users of an application, the user collaboration data indicating durations of collaborations between one or more users of the plurality of users using the application; computing an influencer score of a first user of the plurality of users based on the duration of collaborations between the first user and the one or more users of the plurality of users: determining that the influencer score of the first user exceeds an influencer score threshold; in response to determining that the influencer score of the first user exceeds the influencer score threshold, generating a configuration setting of the application for the first user: and applying the configuration setting to the application for the first user.

Example 2 includes example 1, wherein computing the influencer score of the first user further comprises: determining that the first user interacted, via the application, with a second user of the plurality of users based on the user collaboration data; identifying an individual duration of collaboration of the first user with the second user based on the interaction: identifying a total duration of collaboration of the first user with the plurality of users: computing a relative duration of collaboration of the first user with the second user based on a ratio of the individual duration of collaboration of the first user with the second user and the total duration of collaboration of the first user with the plurality of users; and rendering a graphical user interface that indicates the relative duration of collaboration of the first user, wherein the influencer score of the second user is based on the relative duration of collaboration of the first user with the second user.

Example 3 includes any of the above examples, further comprising: identifying a type of interaction between the first user and the second user based on the user collaboration data; assigning a weight based on the type of interaction; and applying the weight to the individual duration of collaboration of the first user with the second user.

Example 4 includes any of the above examples, further comprising: assigning first different weights for different types of interactions; and within each type of interaction, assigning second different weights for each instance of a type of interaction.

Example 5 includes any of the above examples, further comprising: accessing a first user profile of the first user and a second user profile of the second user: assigning a weight based on the first user profile and the second user profile: and applying the weight to the individual duration of collaboration of the first user with the second user.

Example 6 includes any of the above examples, wherein the user collaboration data further indicate user profiles of the plurality of users and different types of collaborations between the one or more users of the plurality of users, wherein the configuration setting further comprises at least one of a preset reminder setting, a preset targeted email setting, a custom content setting, or a feature setting of the application for the first user.

Example 7 includes any of the above examples, further comprising: computing an influencer score for each user of the plurality of users based on the user interaction data; identifying a first group of users based on the influencer score of each user of the first group of users exceeding the influencer score threshold: generating a first group configuration setting of the application for the first group of users; and applying the first group configuration setting to the application for the first group of users.

Example 8 includes any of the above examples, further comprising: accessing user profile data from a directory application that manages the user profile data for each user of the plurality of users, the user profile data identifying a leadership hierarchy level for each user within an enterprise; identifying leaders among the first group of users based on the user profile data of each user in the first group of users, a leader being in a top percentage of the leadership hierarchy level; computing a centrality score of an enterprise associated with the application, the centrality score being based on a ratio of the number of leaders and the number of users in the first group of users; and rendering a graphical user interface indicating the centrality score of the enterprise.

Example 9 includes any of the above examples, further comprising: receiving adoption content that indicate a promoted feature of the application; communicating the adoption content to the user; measuring a rate of adoption of the adoption content by other users interacting with the user based on updated user collaboration data and application usage data: and rendering a graphical user interface indicating the rate of adoption by the other users.

Example 10 includes any of the above examples, further comprising: identifying an enabling user from the other users based on the rate of adoption of the enabling user exceeding an adoption threshold; identifying a resisting user from the other users based on the rate of adoption of the resisting user being less than the adoption threshold; generating a first configuration setting for the enabling user; generating a second configuration setting for the resisting user; applying the first configuration setting to the application associated with the enabling user; and applying the second configuration setting to the application associated with the resisting user.

Example 11 is a computing apparatus, the computing apparatus comprising: a Processor; and a memory storing instructions that, when executed by the Processor, configure the apparatus to: identify user collaboration data of a plurality of users of an application, the user collaboration data indicating durations of collaborations between one or more users of the plurality of users using the application; compute an influencer score of a first user of the plurality of users based on the duration of collaborations between the first user and the one or more users of the plurality of users; determine that the influencer score of the first user exceeds an influencer score threshold; in response to determining that the influencer score of the first user exceeds the influencer score threshold, generate a configuration setting of the application for the first user; and apply the configuration setting to the application for the first user.

Example 12 includes any of the above examples, wherein computing the influencer score of the first user further comprises: determine that the first user interacted, via the application, with a second user of the plurality of users based on the user collaboration data; identify an individual duration of collaboration of the first user with the second user based on the interaction; identify a total duration of collaboration of the first user with the plurality of users; compute a relative duration of collaboration of the first user with the second user based on a ratio of the individual duration of collaboration of the first user with the second user and the total duration of collaboration of the first user with the plurality of users; and render a graphical user interface that indicates the relative duration of collaboration of the first user, wherein the influencer score of the second user is based on the relative duration of collaboration of the first user with the second user.

Example 13 includes any of the above examples, wherein the instructions further configure the apparatus to: identify a type of interaction between the first user and the second user based on the user collaboration data; assign a weight based on the type of interaction; and apply the weight to the individual duration of collaboration of the first user with the second user.

Example 14 includes any of the above examples, wherein the instructions further configure the apparatus to: assign first different weights for different types of interactions; and within each type of interaction, assign second different weights for each instance of a type of interaction.

Example 15 includes any of the above examples, wherein the instructions further configure the apparatus to: access a first user profile of the first user and a second user profile of the second user: assign a weight based on the first user profile and the second user profile: and apply the weight to the individual duration of collaboration of the first user with the second user.

Example 16 includes any of the above examples, wherein the user collaboration data further indicate user profiles of the plurality of users and different types of collaborations between the one or more users of the plurality of users, wherein the configuration setting further comprises at least one of a preset reminder setting, a preset targeted email setting, a custom content setting, or a feature setting of the application for the first user.

Example 17 includes any of the above examples, wherein the instructions further configure the apparatus to: compute an influencer score for each user of the plurality of users based on the user interaction data: identify a first group of users based on the influencer score of each user of the first group of users exceeding the influencer score threshold; generate a first group configuration setting of the application for the first group of users: and apply the first group configuration setting to the application for the first group of users.

Example 18 includes any of the above examples, wherein the instructions further configure the apparatus to: access user profile data from a directory application that manages the user profile data for each user of the plurality of users, the user profile data identifying a leadership hierarchy level for each user within an enterprise: identify leaders among the first group of users based on the user profile data of each user in the first group of users, a leader being in a top percentage of the leadership hierarchy level; compute a centrality score of an enterprise associated with the application, the centrality score being based on a ratio of the number of leaders and the number of users in the first group of users; and render a graphical user interface indicating the centrality score of the enterprise.

Example 19 includes any of the above examples, wherein the instructions further configure the apparatus to: receive adoption content that indicate a promoted feature of the application: communicate the adoption content to the user: measure a rate of adoption of the adoption content by other users interacting with the user based on updated user collaboration data and application usage data; and render a graphical user interface indicating the rate of adoption by the other users.

Example 20 is a non-transitory computer-readable storage medium, the computer-readable storage medium including instructions that when executed by a computer, cause the computer to perform operations comprising: identify user collaboration data of a plurality of users of an application, the user collaboration data indicating durations of collaborations between one or more users of the plurality of users using the application: compute an influencer score of a first user of the plurality of users based on the duration of collaborations between the first user and the one or more users of the plurality of users; determine that the influencer score of the first user exceeds an influencer score threshold; in response to determining that the influencer score of the first user exceeds the influencer score threshold, generate a configuration setting of the application for the first user; and apply the configuration setting to the application for the first user.

What is claimed is:
1. A computer-implemented method comprising:
identifying user collaboration data of a plurality of users of an application, the user collaboration data indicating durations of collaborations between one or more users of the plurality of users using the application;
computing an influencer score of a first user of the plurality of users based on the duration of collaborations between the first user and the one or more users of the plurality of users;
determining that the influencer score of the first user exceeds an influencer score threshold;
identifying a cohort of the first user based on similar organizational attributes and behavioral characteristics from operation metadata of the application of the first user;
identifying a promoted operation feature of the application, the promoted operation feature indicating a promoted use of a new feature of the application;
communicating the promoted operation feature to the application of the cohort;
measuring a rate of adoption of the promoted operation feature by the cohort by measuring how often each user of the cohort operate the promoted operation feature in the application;

generating a configuration setting of the promoted operation feature of the application for the cohort based on the rate of adoption;

applying the configuration setting of the promoted operation feature to the application of the cohort;

measuring a rate of adoption of the promoted operation feature by other users interacting with one or more users of the cohort based on updated user collaboration data and application usage data; and rendering a graphical user interface indicating the rate of adoption by the other users.

2. The computer-implemented method of claim 1, wherein computing the influencer score of the first user further comprises:

determining that the first user interacted, via the application, with a second user of the plurality of users based on the user collaboration data;

identifying an individual duration of collaboration of the first user with the second user based on the interaction;

identifying a total duration of collaboration of the first user with the plurality of users;

computing a relative duration of collaboration of the first user with the second user based on a ratio of the individual duration of collaboration of the first user with the second user and the total duration of collaboration of the first user with the plurality of users; and rendering a graphical user interface that indicates the relative duration of collaboration of the first user, wherein the influencer score of the second user is based on the relative duration of collaboration of the first user with the second user.

3. The computer-implemented method of claim 2, further comprising:

identifying a type of interaction between the first user and the second user based on the user collaboration data;

assigning a weight based on the type of interaction; and applying the weight to the individual duration of collaboration of the first user with the second user.

4. The computer-implemented method of claim 2, further comprising:

assigning first different weights for different types of interactions; and within each type of interaction, assigning second different weights for each instance of a type of interaction.

5. The computer-implemented method of claim 2, further comprising:

accessing a first user profile of the first user and a second user profile of the second user;

assigning a weight based on the first user profile and the second user profile; and applying the weight to the individual duration of collaboration of the first user with the second user.

6. The computer-implemented method of claim 1, wherein the user collaboration data further indicate user profiles of the plurality of users and different types of collaborations between the one or more users of the plurality of users, wherein the configuration setting further comprises at least one of a preset reminder setting, a preset targeted email setting, a custom content setting, or a feature setting of the application for the first user, wherein communicating the promoted operation feature to the application of the cohort comprises generating a graphical user interface that identifies the promoted operation feature, the graphical user interface comprising a one-click interface element that, when selected by the first user, is configured to generate and send an email populated with the promoted operation feature and pre-addressed to preselected users.

7. The computer-implemented method of claim 1, further comprising:

computing an influencer score for each user of the plurality of users based on the user interaction data;

identifying a first group of users based on the influencer score of each user of the first group of users exceeding the influencer score threshold;

generating a first group configuration setting of the application for the first group of users; and applying the first group configuration setting to the application for the first group of users.

8. The computer-implemented method of claim 7, further comprising:

accessing user profile data from a directory application that manages the user profile data for each user of the plurality of users, the user profile data identifying a leadership hierarchy level for each user within an enterprise;

identifying leaders among the first group of users based on the user profile data of each user in the first group of users, a leader being in a top percentage of the leadership hierarchy level;

computing a centrality score of an enterprise associated with the application, the centrality score being based on a ratio of the number of leaders and the number of users in the first group of users; and rendering a graphical user interface indicating the centrality score of the enterprise.

9. The computer-implemented method of claim 1, further comprising:

receiving adoption content;

communicating the adoption content to a user of the plurality of users;

wherein the adoption content comprises at least one of targeted emails, chat nudges, email nudges, or custom learning content.

10. The computer-implemented method of claim 9, further comprising:

identifying an enabling user from the other users based on the rate of adoption of the enabling user exceeding an adoption threshold;

identifying a resisting user from the other users based on the rate of adoption of the resisting user being less than the adoption threshold;

generating a first configuration setting for the enabling user;

generating a second configuration setting for the resisting user;

applying the first configuration setting to the application associated with the enabling user; and applying the second configuration setting to the application associated with the resisting user.

11. A computing apparatus, the computing apparatus comprising:

a processor; and a memory storing instructions that, when executed by the processor, configure the apparatus to:

identify user collaboration data of a plurality of users of an application, the user collaboration data indicating durations of collaborations between one or more users of the plurality of users using the application;

compute an influencer score of a first user of the plurality of users based on the duration of collaborations between the first user and the one or more users of the plurality of users;

identify a cohort of the first user based on similar organizational attributes and behavioral characteristics from operation metadata of the application of the first user;

identify a promoted operation feature of the application, the promoted operation feature indicating a promoted use of a new feature of the application;

communicate the promoted operation feature to the application of the cohort;

measure a rate of adoption of the promoted operation feature by the cohort by measuring how often each user of the cohort operate the promoted operation feature in the application;

generate a configuration setting of the promoted operation feature of the application for the cohort based on the rate of adoption;

apply the configuration setting of the promoted operation feature to the application of the cohort;

measure a rate of adoption of the promoted operation feature by other users interacting with one or more users of the cohort based on updated user collaboration data and application usage data; and render a graphical user interface indicating the rate of adoption by the other users.

12. The computing apparatus of claim 11, wherein computing the influencer score of the first user further comprises:

determine that the first user interacted, via the application, with a second user of the plurality of users based on the user collaboration data;

identify an individual duration of collaboration of the first user with the second user based on the interaction;

identify a total duration of collaboration of the first user with the plurality of users;

compute a relative duration of collaboration of the first user with the second user based on a ratio of the individual duration of collaboration of the first user with the second user and the total duration of collaboration of the first user with the plurality of users; and render a graphical user interface that indicates the relative duration of collaboration of the first user, wherein the influencer score of the second user is based on the relative duration of collaboration of the first user with the second user.

13. The computing apparatus of claim 12, wherein the instructions further configure the apparatus to:

identify a type of interaction between the first user and the second user based on the user collaboration data;

assign a weight based on the type of interaction; and apply the weight to the individual duration of collaboration of the first user with the second user.

14. The computing apparatus of claim 12, wherein the instructions further configure the apparatus to:

assign first different weights for different types of interactions; and within each type of interaction, assign second different weights for each instance of a type of interaction.

15. The computing apparatus of claim 12, wherein the instructions further configure the apparatus to:

access a first user profile of the first user and a second user profile of the second user;

assign a weight based on the first user profile and the second user profile; and apply the weight to the individual duration of collaboration of the first user with the second user.

16. The computing apparatus of claim 11, wherein the user collaboration data further indicate user profiles of the plurality of users and different types of collaborations between the one or more users of the plurality of users, wherein the configuration setting further comprises at least one of a preset reminder setting, a preset targeted email setting, a custom content setting, or a feature setting of the application for the first user, wherein communicating the promoted operation feature to the application of the cohort comprises generating a graphical user interface that identifies the promoted operation feature, the graphical user interface comprising a one-click interface element that, when selected by the first user, is configured to generate and send an email populated with the promoted operation feature and pre-addressed to preselected users.

17. The computing apparatus of claim 11, wherein the instructions further configure the apparatus to:

compute an influencer score for each user of the plurality of users based on the user interaction data;

identify a first group of users based on the influencer score of each user of the first group of users exceeding the influencer score threshold;

generate a first group configuration setting of the application for the first group of users; and apply the first group configuration setting to the application for the first group of users.

18. The computing apparatus of claim 17, wherein the instructions further configure the apparatus to:

access user profile data from a directory application that manages the user profile data for each user of the plurality of users, the user profile data identifying a leadership hierarchy level for each user within an enterprise;

identify leaders among the first group of users based on the user profile data of each user in the first group of users, a leader being in a top percentage of the leadership hierarchy level;

compute a centrality score of an enterprise associated with the application, the centrality score being based on a ratio of the number of leaders and the number of users in the first group of users; and render a graphical user interface indicating the centrality score of the enterprise.

19. The computing apparatus of claim 11, wherein the instructions further configure the apparatus to:

receive adoption content;

communicate the adoption content to a user of the plurality of users;

wherein the adoption content comprises at least one of targeted emails, chat nudges, email nudges, or custom learning content.

20. A non-transitory computer-readable storage medium, the computer-readable storage medium including instructions that when executed by a computer, cause the computer to perform operations comprising:

identify user collaboration data of a plurality of users of an application, the user collaboration data indicating durations of collaborations between one or more users of the plurality of users using the application;

compute an influencer score of a first user of the plurality of users based on the duration of collaborations between the first user and the one or more users of the plurality of users;

identify a cohort of the first user based on similar organizational attributes and behavioral characteristics from operation metadata of the application of the first user;

identify a promoted operation feature of the application, the promoted operation feature indicating a promoted use of a new feature of the application;

communicate the promoted operation feature to the application of the cohort;

measure a rate of adoption of the promoted operation feature by the cohort by measuring how often each user of the cohort operate the promoted operation feature in the application;

generate a configuration setting of the promoted operation feature of the application for the cohort based on the rate of adoption;

apply the configuration setting of the promoted operation feature to the application of the cohort;

measure a rate of adoption of the promoted operation feature by other users interacting with one or more users of the cohort based on updated user collaboration data and application usage data; and render a graphical user interface indicating the rate of adoption by the other users.

* * * * *